(12) United States Patent
Bareket et al.

(10) Patent No.: US 9,934,247 B2
(45) Date of Patent: Apr. 3, 2018

(54) BUILT-IN SEARCH INDEXING FOR NAS SYSTEMS

(71) Applicant: INTERNATIONAL BUSINESS MACHINES CORPORATION, Armonk, NY (US)

(72) Inventors: Amit Bareket, Yavne (IL); Shai M. Koffman, Hod Hasharon (IL); Moshe Weiss, Petah Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 14/307,803

(22) Filed: Jun. 18, 2014

(65) Prior Publication Data
US 2015/0370839 A1    Dec. 24, 2015

(51) Int. Cl.
*G06F 7/00* (2006.01)
*G06F 17/30* (2006.01)

(52) U.S. Cl.
CPC ................... *G06F 17/302* (2013.01)

(58) Field of Classification Search
CPC ........... G06F 17/3002; G06F 17/30424; G06F 17/30321; G06F 17/30613; G06F 17/30106
See application file for complete search history.

(56) References Cited

U.S. PATENT DOCUMENTS

| | | | |
|---|---|---|---|
| 6,516,337 B1 * | 2/2003 | Tripp | G06F 17/30613 707/999.104 |
| 6,675,205 B2 * | 1/2004 | Meadway | G06F 17/30109 707/999.01 |
| 8,458,363 B2 | 6/2013 | Rosenblatt | |
| 9,201,889 B1 * | 12/2015 | Madany | G06F 17/30106 |
| 2002/0055919 A1 * | 5/2002 | Mikheev | G06F 17/30675 |
| 2002/0165625 A1 * | 11/2002 | Beier | G06F 17/30067 700/50 |
| 2005/0203876 A1 * | 9/2005 | Cragun | G06F 17/30067 |
| 2008/0154882 A1 * | 6/2008 | Chigusa | G06F 17/30011 |
| 2008/0256036 A1 * | 10/2008 | Falk | G06F 17/30864 |
| 2009/0043828 A1 * | 2/2009 | Shitomi | G06F 17/30221 |
| 2009/0052804 A1 * | 2/2009 | Lewis | G06F 17/30011 382/298 |
| 2009/0327261 A1 * | 12/2009 | Hawkins | G06F 17/30864 |

(Continued)

*Primary Examiner* — Hasanul Mobin
(74) *Attorney, Agent, or Firm* — Griffiths & Seaton PLLC

(57) ABSTRACT

Methods, computing systems and computer program products implement embodiments of the present invention that include storing multiple files to a file-level storage system that includes one or more storage devices, and maintaining, by the file-level storage system, one or more searchable indexes for the multiple files, each of the indexes indexing a respective key field. In some embodiments the file-level storage system may be configured as a network attached storage system. Upon receiving, via a network, a search query from a computer, the file-level storage system can identify, using the one or more searchable indexes, one or more of the multiple files that match the search query, and convey, to the computer, the respective name and the respective location of each of the one or more identified files. In some embodiments, the file-level storage system includes a web server exposing a representational state transfer application programming interface.

18 Claims, 3 Drawing Sheets

(56) References Cited

U.S. PATENT DOCUMENTS

| | | | |
|---|---|---|---|
| 2011/0276580 A1* | 11/2011 | Press | G06F 17/30401 |
| | | | 707/759 |
| 2013/0013559 A1 | 1/2013 | Pomerantz | |
| 2013/0198226 A1* | 8/2013 | Dhuse | G06F 17/30106 |
| | | | 707/769 |
| 2013/0332473 A1* | 12/2013 | Ryman | G06F 17/30569 |
| | | | 707/754 |
| 2014/0136543 A1* | 5/2014 | Frieden | G06F 17/3097 |
| | | | 707/741 |
| 2015/0161266 A1* | 6/2015 | Conradt | G06F 17/30867 |
| | | | 707/706 |

* cited by examiner

BUILT-IN SEARCH INDEXING FOR NAS SYSTEMS

CROSS-REFERENCE TO RELATED APPLICATIONS

This application is related to U.S. Patent Application titled "Synchronizing User States Across Multiple Clients of a NAS System" filed on even date with the present application, and which is incorporated herein by reference.

FIELD OF THE INVENTION

The present invention relates generally to data storage, and specifically to providing searchable indexes for files stored on network attached storage (NAS) systems.

BACKGROUND

Network attached storage (NAS) is file-level computer data storage system connected to a computer network that provides data access to a heterogeneous group of clients. A NAS system typically comprises a computer connected to a network that provides file-based data storage services to other client devices on the network. In operation a NAS system appears to the clients as a file server (the client can map network drives to shares on that server) storing files in a single rooted tree of directories.

The description above is presented as a general overview of related art in this field and should not be construed as an admission that any of the information it contains constitutes prior art against the present patent application.

SUMMARY

There is provided, in accordance with an embodiment of the present invention a method, including storing multiple files to a file-level storage system including one or more storage devices, maintaining, by the file-level storage system, one or more searchable indexes for the multiple files, each of the indexes indexing a respective key field, receiving, from a computer in communication with the file-level storage system via a network, a search query, and identifying, using the one or more searchable indexes, one or more of the multiple files that match the search query.

There is also provided, in accordance with an embodiment of the present invention a computing facility, including a communications network, a computer and a file-level storage system. The file-level storage system includes one or more storage devices, a storage processor configured to store multiple files the one or more storage devices, and a management processor configured to maintain one or more searchable indexes for the multiple files, each of the indexes indexing a respective key field, to receive, from a computer in communication with the file-level storage system via the communications network, a search query, and to identify, using the one or more searchable indexes, one or more of the multiple files that match the search query.

There is further provided, in accordance with an embodiment of the present invention a computer program product, the computer program product including a non-transitory computer readable storage medium having computer readable program code embodied therewith, the computer readable program code including computer readable program code configured to store multiple files to a file-level storage system including one or more storage devices, computer readable program code configured to maintain, by the file-level storage system, one or more searchable indexes for the multiple files, each of the indexes indexing a respective key field, computer readable program code configured to receive, from a computer in communication with the file-level storage system via a network, a search query, and computer readable program code configured to identify, using the one or more searchable indexes, one or more of the multiple files that match the search query.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for a file-level storage system to provide file indexing services. While embodiments herein describe file indexing services implemented on a network attached storage (NAS) system, the file indexing services may be implemented on any file-level storage system such as Windows™ or Linux™ based file servers.

In some embodiments, the file-level storage system comprises one or more storage devices, and while storing multiple files on the one or more storage devices, the file-level storage system is configured to maintain one or more searchable indexes for the multiple files, each of the indexes indexing a respective key field. Upon receiving, from a computer in communication with the file-level storage system via a network, a search query, the file based storage system is configured to identify, using the one or more searchable indexes, one or more of the multiple files that match the search query, and to convey the name and location if each of the identified files to the computer, thereby responding to the search query.

Since file indexing and search services are incorporated into the file based storage system, embodiments of the present invention reduce the need for an external search appliance. In operation, file based storage systems implementing embodiments of the present invention enable users of networked computers to rapidly locate files stored on the file based storage system in a manner and speed similar to locating files stored on a local storage device in the networked computer. In operation, a user of a given networked computer can organize all his files "flat" in his root folder (i.e., not use a hierarchical file system) and search for any given file using embodiments described herein.

Figure 1:
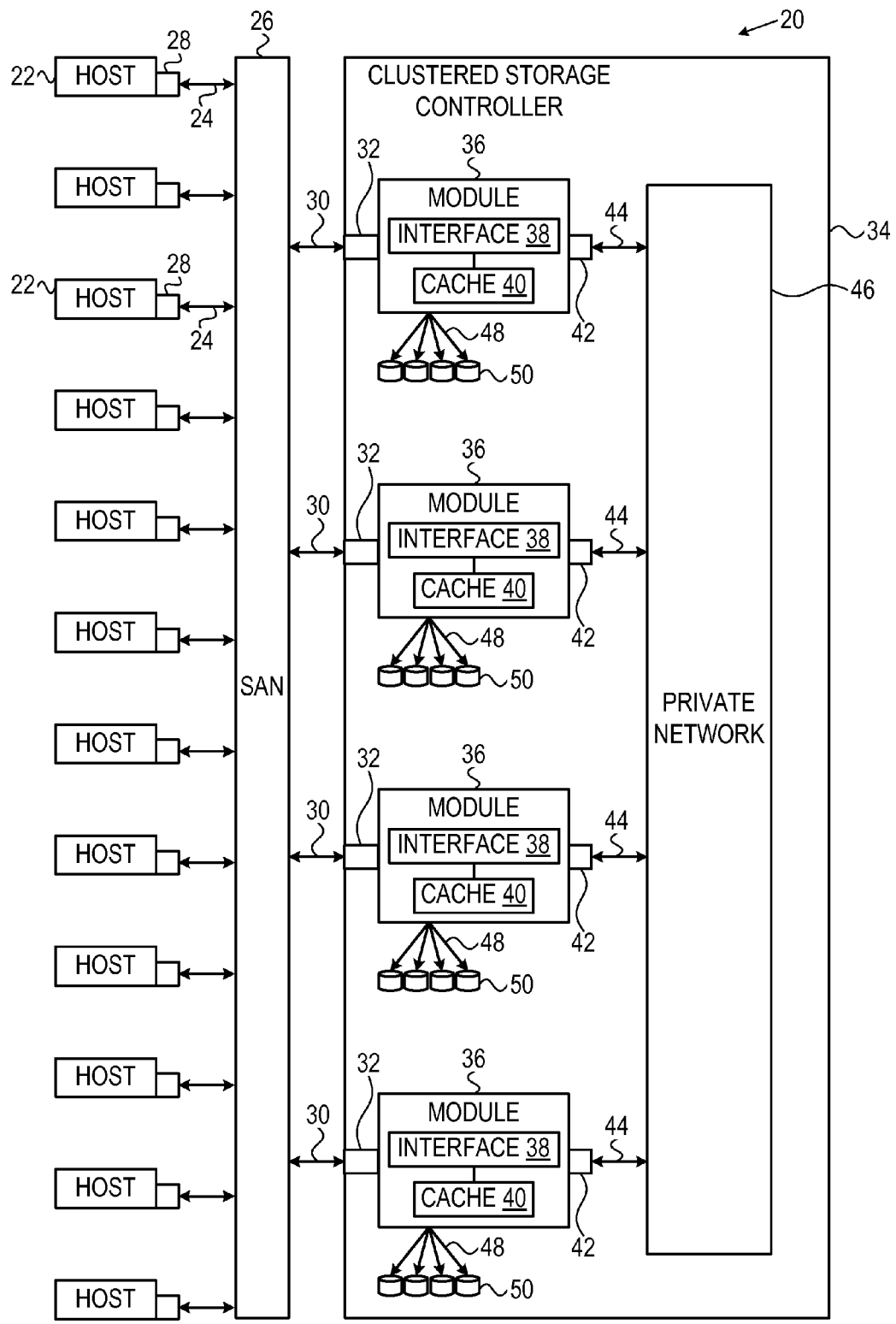
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
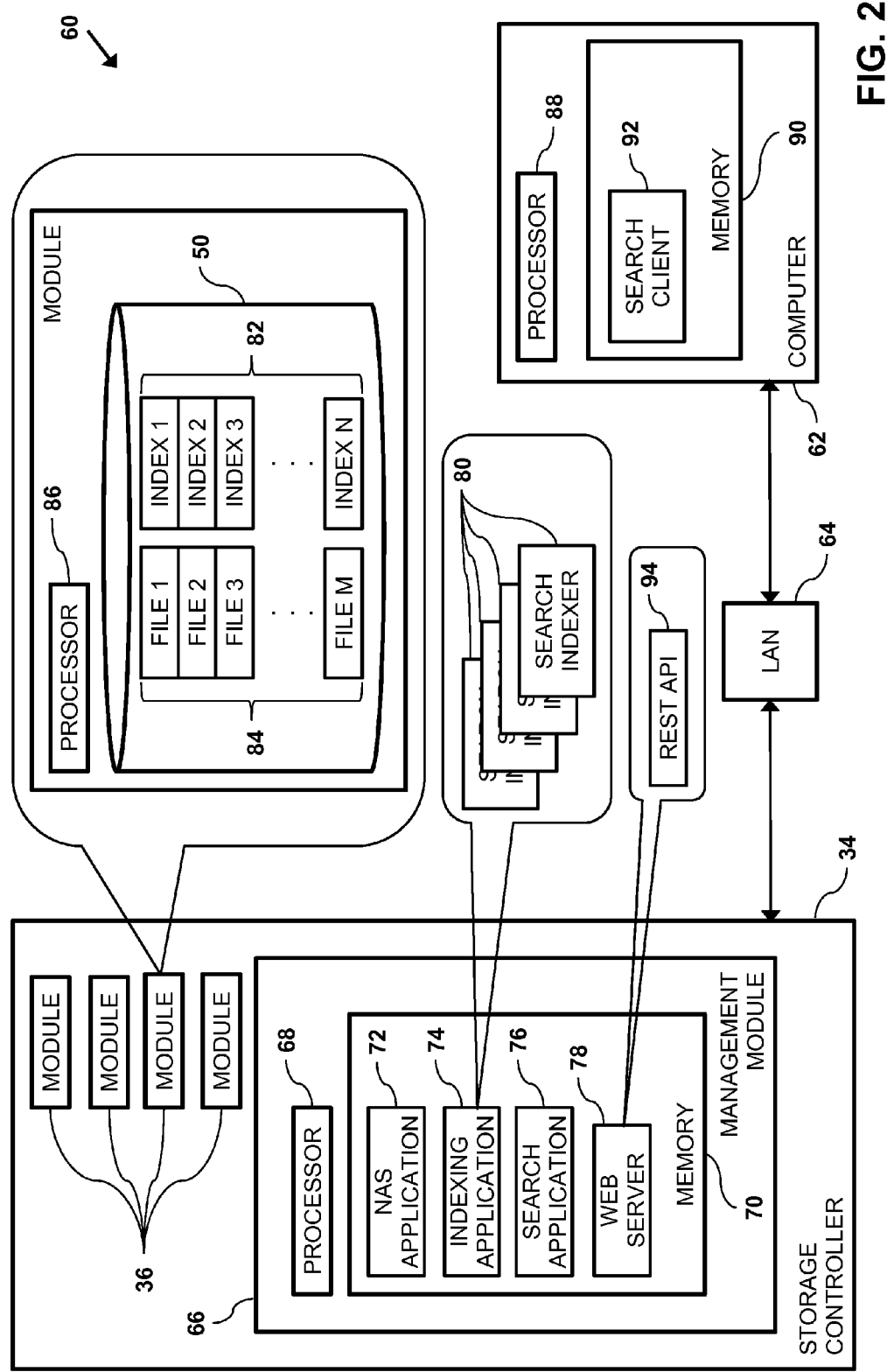
FIG. 2 is a block diagram that schematically illustrates a computing facility comprising the storage system configured to provide network attached storage (NAS) with search indexing services a client computer, in accordance with an embodiment of the present invention.

FIG. 2 is a block diagram that schematically illustrates a computing facility 60 comprising a storage controller 34 configured to provide network attached storage (NAS) with search indexing services to a computer 62 via a local area network (LAN) 64, in accordance with an embodiment of the present invention. While the example in FIG. 2 shows storage controller 34 in communication with a single computer 62 via LAN 64, multiple computers communicating with one or more storage controllers 34 via other types of networks is considered to be the spirit and scope of the present invention. For example, multiple storage controllers 34 and multiple computers 62 can communicate with each other via one or more communications networks such as LAN 64, a wide area network (WAN), and the Internet.

In addition to modules 36, storage controller comprises a management module 66 that manages the interaction between modules 36 and computer 62. Although not explicitly shown in FIG. 2 for purposes of illustrative simplicity, management module 66 can communicate with modules 36 via private network 46.

Management module 66 comprises a management processor 68 and a management memory 70. In operation, processor 68 executes, from memory 70, a NAS management application 72, an indexing application 74, a search engine application 76 and a web server 78. NAS management application 72 comprises a software application that enables storage controller 34 to function as a NAS system by receiving and processing file and directory level storage commands. Examples of operations performed by file-level storage commands include, but are not limited to, creating a file, reading data from a file, writing data to a file, copying or moving a file to a new location and deleting a file.

Indexing application 74 comprises a software application that enable processor 68 to create and maintain index files 82 (also referred to herein as searchable indexes) for data files 84 stored on storage devices 50. In the example shown in FIG. 2, indexing application 74 comprises multiple search indexers 80. In operation, search indexers 80 are "pluggable", and each of the search indexers can be configured to index specific information. For example, a first given search indexer 80 may be configured to index Exchangeable image file format (Exif) information for multimedia files, a second given search indexer can be configured to index tags for multimedia files, and a third given search indexer can be configured to index date information (e.g., creation date, update date, access dates) for all types of files. In operation, as additional search criteria are identified, respective additional search indexers 80 can be configured in memory 70.

In operation, for files 84, indexing application can index information such as:
File/folder names (including dates and locations contained in a file/folder name).
User habits. User habits include user activity such as opening specific files in specific dates in a month or number of times in a day, opening specific file together with other files together, etc. This information can be used to provide the user with suggestions/related files while the user is typing a search pattern.
User tagging. a user can tag every file/folder to quickly find it later on.
Digital photograph Exif data.
Digital photograph face tagging.
ASCII/Text files crawling mechanism (i.e.,
File types.
All user activity for every newly created or updated files and folder.

In some embodiments, processor 68 can specify an amount of storage space on storage devices 50 to be dedicated to storing indexes 82. In additional embodiments, storage controller 34 may store indexes 82 in an indexer database on storage devices 50.

Search application 76 comprises a software application that receives and processes file-level search queries from computer 62. In the configuration shown in FIG. 2, search application 76 interacts with web server 78, which is configured to function as a gateway between the search application and computer 26 (and other computing devices not shown that convey search queries to storage controller 34 via LAN 64). In some embodiments, web server 78 enables processor 68 to expose a representational state transfer (REST or RESTful) application programming interface (API) 94 that enables embedding of search capabilities (i.e., the REST API) in client tools, mobile applications, and laptop/desktop computers. Examples of search queries that processor 68 can receive and process (using search application 76 and web server 78), include, but are not limited to:

List<File> GetFilesForPattern(<KeyValue>, long clientID), where:
File represents a file name and includes its type, location and other important information for clients.
KeyValue is a dictionary that contains filters as patterns such as tags, dates, user activity, Global Positioning System (GPS) for pictures, etc., so a client can ask for files for any mix of filters.
ClientID comprises client an identifier that can be help configure the management processor to operate as a learning system that can learn common searches and browsing activity for a client.
TagFiles(List<File>, List<String> tag). This is a boolean operation which tags selected files with selected strings.
TagFace(File, Area, String tag). This is a boolean operation that detects faces in digital photographs (or other media files).

In some embodiments, the functionality of indexing application 74, search application 76 and web server 78 may be incorporated into NAS management application 72. In further embodiments, facility 60 may comprise multiple storage controllers 34, and management module 66 may configure the storage controllers as a NAS cluster, and utilize all the resources in the NAS cluster for distributed file-level services including search indexing services using embodiments described herein. For example, management module 66 can configure the NAS cluster as a distributed search engine that can handle a "big data" database by dividing the big data between the storage controllers.

In addition to storage devices 50 that are configured to store files 84 and indexes 82, each module 36 comprises a module processor 86 that is configured to process block level storage operations, as described supra. Computer 62 comprises a client processor 88 and a client memory 90. Processor 88 executes, from memory 90, search client 92 that communicates with search application 76 and/or web server 78 using protocols such as Network File System (NFS) or Server Message Block (SMB, also referred to as "Samba").

In embodiments herein, search client 92 also functions as an NAS client that enables processor 88 to store and retrieve data from data files 84 (i.e., process file-level storage commands). In alternative embodiments, processor 88 may execute a standalone NAS client application from memory 92.

Processors 68, 86 and 88 may comprise general-purpose central processing units (CPU) or special-purpose embedded processors, which are programmed in software or firmware to carry out the functions described herein. The software may be downloaded to modules 36, 66 and computer 62 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Indexing and Search Services

Figure 3:
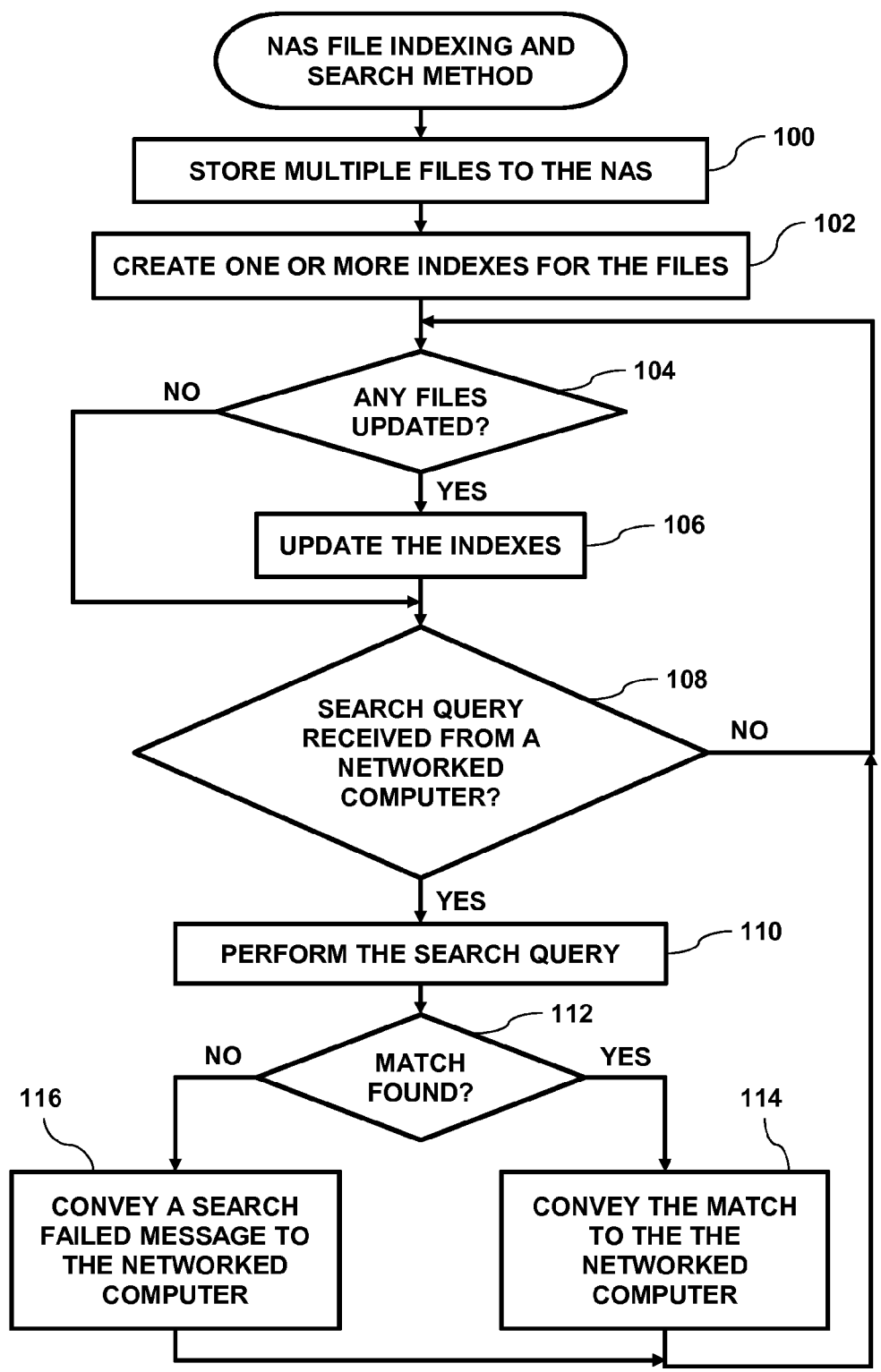
FIG. 3 is a flow diagram that schematically illustrates a method of indexing and searching files stored on the NAS system, in accordance an embodiment of the present invention.

FIG. 3 is a flow diagram that schematically illustrates a method of indexing and searching files 84, in accordance an embodiment of the present invention. In a store step 100, processor 88 (or other computing devices coupled to LAN 64) stores files 84 to one or more storage devices 50, and in an indexing step 102, processor 86 creates one or more searchable indexes 82 for the files, each of the indexes indexing a respective key field. Each of the key fields comprises information such as a file name, a file description, a file type, a file creation date, a last file update date, a last file access date, a file location, and file contents (e.g., text and tags).

As described supra, storage controller 34 comprises a management processor 68 configured to execute NAS management module 73. Therefore in embodiments herein, storage controller is configured to function as a file-level storage system (e.g., a NAS).

In a first comparison step 104, if processor 86 detects any updates to any given file 84, then the module processor updates the one or more indexes in an update step 106. In embodiments of the present invention, updates to a given file comprise operations including, but not limited to, creating the given file, updating the given file, deleting the given file, accessing the given file, copying the given file and moving the given file. Additionally, in embodiments herein, the steps of creating indexes 82 and updating the indexes are carried out by indexing application 74, and may also be referred to as maintaining the one or more indexes.

Additional operations performed by indexing application 74 include, but are not limited to:

Updating indexes 82 when any files 84 (and/or directories) are added, updated, moved or deleted.

Updating indexes 82 when an additional storage device 50 is coupled to storage controller 34, the additional storage device storing one or more additional files 84. For example, a Universal Serial Bus (USB) disk drive storing the additional files may be connected to a given module 36.

In a second comparison step 108, if search application 76 (executing on processor 68) receives a search query comprising one or more keywords, then in a search step 110, the management processor performs the search query to identify any files 84 that match the keyword(s). Examples of searches received from computer 62 include, but are not limited to:

Files that were recently accessed by a given user.

Digital photographs that were taken at a holiday event last year and including a given user.

A word processing document describing the budget of a given year, and last edited by a given user.

All files related to a given user's yearly vacation.

To perform the search query, search application 76 executing on processor 68 identifies one or more indexes 82 necessary to perform the search, and searches the identified one or more indexes for the keyword(s). For example, if the search query is looking for a spreadsheet containing last year's annual budget, processor 68 can first identify a first given index 82 that indexes file types and locate, in the first given index, a first subset of files 84 that are spreadsheet files. Processor 68 can then identify a second given that indexes contents (e.g., text) of files 84, and locate, in the second index, one or more files in the first subset that contain the keywords "budget" and the requested year.

In a third comparison step 112, if processor 68 identified one or more files 84 that matched the received search query, then in a first notification step 114, the management processor conveys a first message, to computer 62, consisting of a name and a location of each the identified one or more files. In some embodiments, processor 68 can also identify one or more additional files that are associated with the one or more files that match the received search query. For example, if the search query is for a spreadsheet file containing an annual budget, in addition to identifying the spreadsheet file, processor 68 can also identify a word processing document that describes the annual budget, and convey a name and a location of the word processing document to computer 62.

Returning to step 112, if processor 68 failed to identify any given file 84 that matched the received search query, then in a second notification step 116, the management processor conveys a second message, to computer 62, indicating that no files 84 were identified. The second message is also referred to herein as a failed message.

Returning to step 108, if processor 68 does not receive a search query, then the method continues with step 104. Returning to step 104, if processor 86 does not detect any updates to any given file 84, then the method continues with step 108.

In operation, search application 76 and search client 92 can be configured as a "smart indexing service" to keep track of a user's search preferences (or multiple users' search preferences). In some embodiments the smart indexing service can convey, to the user, search recommendations such as:

A list of recent searches performed by the user (or other users).

A list of frequent searches performed by the user (or other users).

A list of files (and/or directories) recently added by the user.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

storing multiple files to a file-level storage system comprising one or more storage devices, the file-level storage system comprising a network attached storage (NAS) system remote to a computer; wherein the multiple files are organized by a user in a flat format within a root folder of the file-level storage system in order for the multiple files are not organized in a hierarchal format;

maintaining, by the file-level storage system and without maintaining by an external search appliance, one or more searchable indexes for the multiple files, each of the indexes indexing a respective key field, the key field comprising contents of the files, attributes of the files, and individual user habits associated with accessing the files; wherein the individual user habits associated with accessing the files comprises identifying specific dates of the month and days of the week the user opens one or more of the files, and further identifying which particular ones of the files the user opens together at a given time;

receiving, from the computer in communication with the file-level storage system via a network, a search query;

identifying, using the one or more searchable indexes, one or more of the multiple files that match the search query; and returning, to the computer, a notification specifying the one or more multiple files matching the search query including suggestions to related files to the one or more multiple files matching the search query based on the individual user habits, thereby providing the user of the computer being remote to the file-level storage system the specified one or more multiple files matching the search query with a speed and efficiency of a locally-based storage system to the computer.

2. The method according to claim 1, wherein each of the multiple files has a name and a location, and comprising conveying, to the computer, the respective name and the respective location of each of the one or more identified files.

3. The method according to claim 2, and comprising identifying, for a given file matching the search query, one or more additional files associated with the given file, and conveying, to the computer, the respective name and the respective location of each of the one or more additional files.

4. The method according to claim 1, and comprising conveying a search failed message to the computer upon failing to identify a given file that matches the search query.

5. The method according to claim 1, wherein the attributes for a given file is selected from a list comprising a file name, a file creation date, a file update date, a file access date, a file type, a file description, user tags, Exchangeable image file format data, and user activity.

6. The method according to claim 1, wherein the file-level storage system comprises a web server exposing a representational state transfer (RESTful) application programming interface (API), and wherein the search query is received via the RESTful API.

7. A computing facility, comprising:
a communications network;
a computer; and
a file-level storage system comprising a network attached storage (NAS) system remote to the computer, and comprising:
one or more storage devices;
a storage processor configured to store multiple files the one or more storage devices; wherein the multiple files are organized by a user in a flat format within a root folder of the file-level storage system in order for the multiple files are not organized in a hierarchal format; and
a management processor configured:
to maintain, by the file-level storage system and without maintaining by an external search appliance, one or more searchable indexes for the multiple files, each of the indexes indexing a respective key field, the key field comprising contents of the files, attributes of the files, and individual user habits associated with accessing the files; wherein the individual user habits associated with accessing the files comprises identifying specific dates of the month and days of the week the user opens one or more of the files, and further identifying which particular ones of the files the user opens together at a given time,
to receive, from a computer in communication with the file-level storage system via the communications network, a search query,
to identify, using the one or more searchable indexes, one or more of the multiple files that match the search query, and
to return, to the computer, a notification specifying the one or more multiple files matching the search query including suggestions to related files to the one or more multiple files matching the search query based on the individual user habits, thereby providing the user of the computer being remote to the file-level storage system the specified one or more multiple files matching the search query with a speed and efficiency of a locally-based storage system to the computer.

8. The computing facility according to claim 7, wherein each of the multiple files has a name and a location, and wherein the management processor is configured to convey, to the computer, the respective name and the respective location of each of the one or more identified files.

9. The computing facility according to claim 8, wherein the management processor is configured to identify, for a given file matching the search query, one or more additional files associated with the given file, and to convey, to the computer, the respective name and the respective location of each of the one or more additional files.

10. The computing facility according to claim 7, and wherein the management processor is configured to convey a search failed message to the computer upon failing to identify a given file that matches the search query.

11. The computing facility according to claim 7, wherein the attributes for a given file is selected from a list comprising a file name, a file creation date, a file update date, a file access date, a file type, a file description, user tags, Exchangeable image file format data, and user activity.

12. The computing facility according to claim 7, wherein the management processor is configured to execute a web server exposing a representational state transfer (RESTful) application programming interface (API), and wherein the management processor is configured to receive the search query via the RESTful API.

13. A computer program product, the computer program product comprising:
a non-transitory computer readable storage medium having computer readable program code embodied therewith, the computer readable program code comprising:
computer readable program code configured to store multiple files to a file-level storage system comprising one or more storage devices, the file-level storage system comprising a network attached storage (NAS) system remote to a computer; wherein the multiple files are organized by a user in a flat format within a root folder of the file-level storage system in order for the multiple files are not organized in a hierarchal format;
computer readable program code configured to maintain, by the file-level storage system and without maintaining by an external search appliance, one or more searchable indexes for the multiple files, each of the indexes indexing a respective key field, the key field comprising contents of the files, attributes of the files, and individual user habits associated with accessing the files; wherein the individual user habits associated with accessing the files comprises identifying specific dates of the month and days of the week the user opens one or more of the files, and further identifying which particular ones of the files the user opens together at a given time;

computer readable program code configured to receive, from the computer in communication with the file-level storage system via a network, a search query;

computer readable program code configured to identify, using the one or more searchable indexes, one or more of the multiple files that match the search query; and computer readable program code configured to return, to the computer, a notification specifying the one or more multiple files matching the search query including suggestions to related files to the one or more multiple files matching the search query based on the individual user habits, thereby providing the user of the computer being remote to the file-level storage system the specified one or more multiple files matching the search query with a speed and efficiency of a locally-based storage system to the computer.

14. The computer program product according to claim 13, wherein each of the multiple files has a name and a location, and comprising computer readable program code configured to convey, to the computer, the respective name and the respective location of each of the one or more identified files.

15. The computer program product according to claim 14, and comprising computer readable program code configured to identify, for a given file matching the search query, one or more additional files associated with the given file, and to convey, to the computer, the respective name and the respective location of each of the one or more additional files.

16. The computer program product according to claim 13, and comprising computer readable program code configured to convey a search failed message to the computer upon failing to identify a given file that matches the search query.

17. The computer program product according to claim 13, wherein the attributes for a given file is selected from a list comprising a file name, a file creation date, a file update date, a file access date, a file type, a file description, user tags, Exchangeable image file format data, and user activity.

18. The computer program product according to claim 13, wherein the file-level storage system comprises computer readable program code configured to execute a web server exposing a representational state transfer (RESTful) application programming interface (API), and wherein the search query is received via the RESTful API.

* * * * *